United States Patent [19]

Zeuschner

[11] Patent Number: 5,205,394
[45] Date of Patent: Apr. 27, 1993

[54] DEVICE FOR THE PERPENDICULAR CHANGE IN THE DIRECTION OF CONVEYANCE OF A FOODSTUFF, IN PARTICULAR CHEESE, SAUSAGE AND SIMILAR PRODUCT IN SLICE FORM

[75] Inventor: Roland Zeuschner, Hergatz, Fed. Rep. of Germany

[73] Assignee: Natec, Reich, Summer GmbH & Co. KG., Opfenbach, Fed. Rep. of Germany

[21] Appl. No.: 738,571

[22] Filed: Jul. 31, 1991

[30] Foreign Application Priority Data

Feb. 22, 1991 [DE] Fed. Rep. of Germany ....... 9102061

[51] Int. Cl.⁵ .............................................. B65G 47/46
[52] U.S. Cl. .................................. 198/369; 198/463.3
[58] Field of Search ................... 198/369, 458, 463.3, 198/782; 209/592

[56] References Cited

U.S. PATENT DOCUMENTS

| | | | |
|---|---|---|---|
| 3,134,476 | 5/1964 | Pierson et al. | 198/463.3 |
| 3,194,380 | 7/1965 | Watson | 198/463.3 |
| 3,272,331 | 9/1966 | Thiele et al. | 209/592 |
| 4,109,781 | 8/1978 | Moons | 198/463.3 |
| 4,821,865 | 4/1989 | Hirata et al. | 198/369 |

Primary Examiner—Joseph E. Valenza
Attorney, Agent, or Firm—Brown, Martin, Haller & McClain

[57] ABSTRACT

The invention concerns a device for the perpendicular change in the direction of travel of a food, in particular, cheese, sausage and such in slice form, whereby the food is transferred in conjunction with a 90° rotation via a conveyor device onto a conveyor belt perpendicular thereto. The device features a supply belt in the direction of travel which places the food as a single slice onto a reorientation device whereby the reorientation device has a first and a second lift position and whereby the first raised lift position of the first variant or the first lowered lift position of the second variant conveys the individual slice in a longitudinal direction in a conveyor device in the original direction of travel whereas in the second lowered lift position of the first variant or the second raised lift position of the second variant another displaced conveyor device engages the individual slice and transfers it onto a transfer belt.

9 Claims, 10 Drawing Sheets

DEVICE FOR THE PERPENDICULAR CHANGE IN THE DIRECTION OF CONVEYANCE OF A FOODSTUFF, IN PARTICULAR CHEESE, SAUSAGE AND SIMILAR PRODUCT IN SLICE FORM

BACKGROUND OF THE INVENTION

The present invention is directed to a device for producing a perpendicular change in the conveyance direction of products such as sliced foodstuffs in a packaging apparatus. Such a device is known in a version in which a product is introduced via a conveyor system on a conveyor belt perpendicular thereto. In other words, at the point of transfer from one conveyor belt to the other perpendicular conveyor belt below, the product must travel a certain fall distance with the disadvantage that the product may turn during the fall, that it may be damaged, and that it may not guarantee a sufficient packaging quality.

Certain cases require a paper foil or synthetic foil underneath the product slice in order to package and stack such products with an interposed foil at the following packing station. If such a product with foil underneath is to be handled with the familiar perpendicular transfer, this would not be possible because the foil would adversely affect the glide properties of the product on the belt to such an extent that a perpendicular transfer of the product onto the belt below would no longer be guaranteed. Inasmuch as the product also has the tendency to separate from the foil during its free fall onto the belt below, a subsequent adhesion of the product to the foil below is no longer guaranteed.

In addition, there is the disadvantage that products with the risk of breakage such as certain cheese varieties which must be turned 90° in their direction of conveyance as individual slices cannot be handled with such traditional devices because the slice can break due to the free fall of the individual slice from the upper belt to the belt below.

SUMMARY OF THE INVENTION

The underlying objective of the present invention is therefore to further develop a device of the familiar type so that even the direction of travel of breakable individual slices of foodstuffs, in particular cheese and sausage, can be changed reliably by 90° even if they are placed on individual foils.

Essential characteristic of the present invention is the fact that a supply belt in one plane places the individual slice to be turned in its direction of travel onto a reorientation device operating in two lift positions different from one another, whereby in the lowered lift position of the reorientation device the individual slice is conveyed longitudinally (further conveyance) in the original direction of travel, while in the second lift position the individual slice is subject to a second direction of travel perpendicular to the previously described direction of travel and which brings the individual slice to a transfer belt perpendicular to the first supply belt at an angle of 90°.

In other words, characteristic of the reorientation of the direction of travel is the reorientation device which consists of two different conveyance devices at an angle of 90° to one another, with one conveyance device operating in the longitudinal direction of the supply belt and the second conveyance device operating in the longitudinal direction of the transfer belt. The prerequisite is that the supply belt is at an angle of 90° to the transfer belt.

Obviously, the present invention also accommodates the use of other angles which deviate from 90° in such a device.

Essential is the switch of the reorientation device from the first conveyance device to the second through the timed control of a lift cylinder in conjunction with the timed control of a longitudinal feed stop via a second lift cylinder.

According to the present invention, the individual slice to be oriented is first brought to the supply belt whereby the individual slice is guided by a conveyor to the supply belt and whereby the individual slice is subjected to a good/bad evaluation. Such an evaluation can be accomplished for example by weighing the individual slice. In other words, if a scale located in the conveyor line determines that the individual slice is underweight or overweight, the control of the reorientation device is effected as a function of this weighing signal.

This product is to be separated. For this reason, the first conveyor device which transports the individual slice in extension to the supply belt remains engaged with the individual slice, and the lifting device is not controlled so that the individual slice to be separated is transported out of the device through the reorientation device in the direction of travel of the supply belt.

However, if the weighing device detects a proper individual slice, this "good" signal is used to engage the second conveyor device of the reorientation device with the individual slice, whereby this individual slice is carried onto the transfer belt in perpendicular direction to the direction of travel of the supply belt.

The exact control of the movement of the lift cylinder for activating the first and second conveyor device of the orientation device takes place in conjunction with a second lift cylinder, which controls a longitudinal feed stop. This longitudinal feed stop is arranged at the reorientation device in the direction of exit and limits the exit of the reorientation device in the direction of cut-off.

According to a first preferred embodiment of this invention, the reorientation device is activated in that the slice to be reoriented is transported from the supply belt against a feed stop through the first conveyor device in a raised position. As soon as this slice has reached the feed stop, the first conveyor device is reoriented from a raised position to a lowered position.

In other words, the actively driven transport rollers of the first conveyor device are lowered into the intermediate area between the actively driven round belts of the second conveyor device so that these round belts of the second conveyor device engage the slice to be reoriented. After the direction of travel of the first conveyor device is perpendicular to the direction of travel of the second conveyor device, it results in a reorientation of 90°, and the product is transported onto a transfer belt via the actively driven round belts of the second conveyor device.

An essential characteristic of this first variant is its particularly simple lift control for the first conveyor device.

Specifically, the first conveyor device consists of individual, parallel jointly-driven transport rollers driven by a common sprocket belt.

Each transport roller is connected to a ratchet wheel, and all ratchet wheels are embraced by a sprocket belt which at the same time runs through the drive shaft of the supply belt and therefore drives the supply belt and the first conveyor device.

Significant is the fact that the transport rollers of the first conveyor device are unilaterally overhung in a housing and that the housing itself can be raised and lowered. It consists of a raisable and lowerable upper part which accommodates the unilaterally biased bearings of the transport rollers of the first conveyor device whereby this upper part can be raised and lowered in relation to a fixed lower part. Raising the entire upper part of the housing raises the bearing sites of the transport rollers and, as a result, the transport rollers themselves.

Similarly, the upper part of the housing can be lowered whereby the transport rollers are brought into the intermediate area between the round belts of the second conveyor device, and the second conveyor device engages the product slice to be reoriented 90°.

In addition, it is essential to note that the round belts of the second conveyor device are also driven synchronously and jointly via a common drive in conjunction with the round belts of the transfer belt.

Nevertheless only a single drive motor is required for the entire installation, which via appropriate sprocket belts drives the supply belt and the first conveyor device on the one hand, the second conveyor device in connection with the transfer belt on the other. This results in significant savings since there is only one motor.

This first embodiment offers the advantage that the area underneath the first and second conveyor device has no mechanical parts (cylinders, drive shafts, and such) exposed to dirt. All cylinders required for the active lift movement are arranged in a housing which is outside the area in contact with the product. This results in favorable conditions for cleaning the entire installation. A further characteristic is the fact that the exit belt is foldable in relation to the second conveyor device, thus resulting in significantly better conditions for cleaning the transport rollers and roller holders of all belts and rollers.

The second variant offers the advantage of a relatively more compact design when the parts necessary for the lift motion are also arranged underneath the first and second conveyor device.

The difference with the earlier first variant is that a reorientation from the first direction of travel to the second direction of travel occurs when the second direction of travel is brought from a lowered position to a raised position.

In other words, the difference between the second variant and the first is the fact that in the second variant the first conveyor device is fixed and cannot be lowered whereas in the first variant the first conveyor device was raisable and lowerable. In contrast, the second conveyor device can be raised and lowered in the second variant whereas this second conveyor device is fixed in the first variant.

The product comes from the supply belt and is transported onto the reorientation device, which transports the product further in the direction of travel of the supply belt through actively driven transport rollers, until the product comes to rest shortly before the feed stop arranged in the exit direction. Light barriers detect the presence of the product on the reorientation device. The good/bad weigh signal occurs at this point and determines whether the product is reoriented onto the transfer belt, whereby the lift cylinder for the reorientation device is activated and the second conveyor device is raised thus lifting the product and transporting it in the direction of travel onto the transfer belt, or the control of the second lift cylinder lowers the feed stop. The first lift cylinder which activates the conveyor device remains lowered so that the product is transported to a correcting station on the exit side in the direction of travel of the supply belt through the activated reorientation device. The correcting station is a work station where for example product is added manually to reach the nominal weight.

The object of the present invention does not only encompass the object of the individual patent claims, but also the combination of the various patent claims among each other.

All data and characteristics disclosed in this application, including the Abstract, and in particular the set-up represented in the drawings, are claimed as an integral part of the invention to the extent they severally or jointly represent the state of the art.

BRIEF DESCRIPTION OF THE DRAWINGS

The following is a more detailed description by way of drawings illustrating one variant. These drawings and their description disclose further essential characteristics and advantages of the invention.

DESCRIPTION OF THE PREFERRED EMBODIMENT(S)

Figure 1:
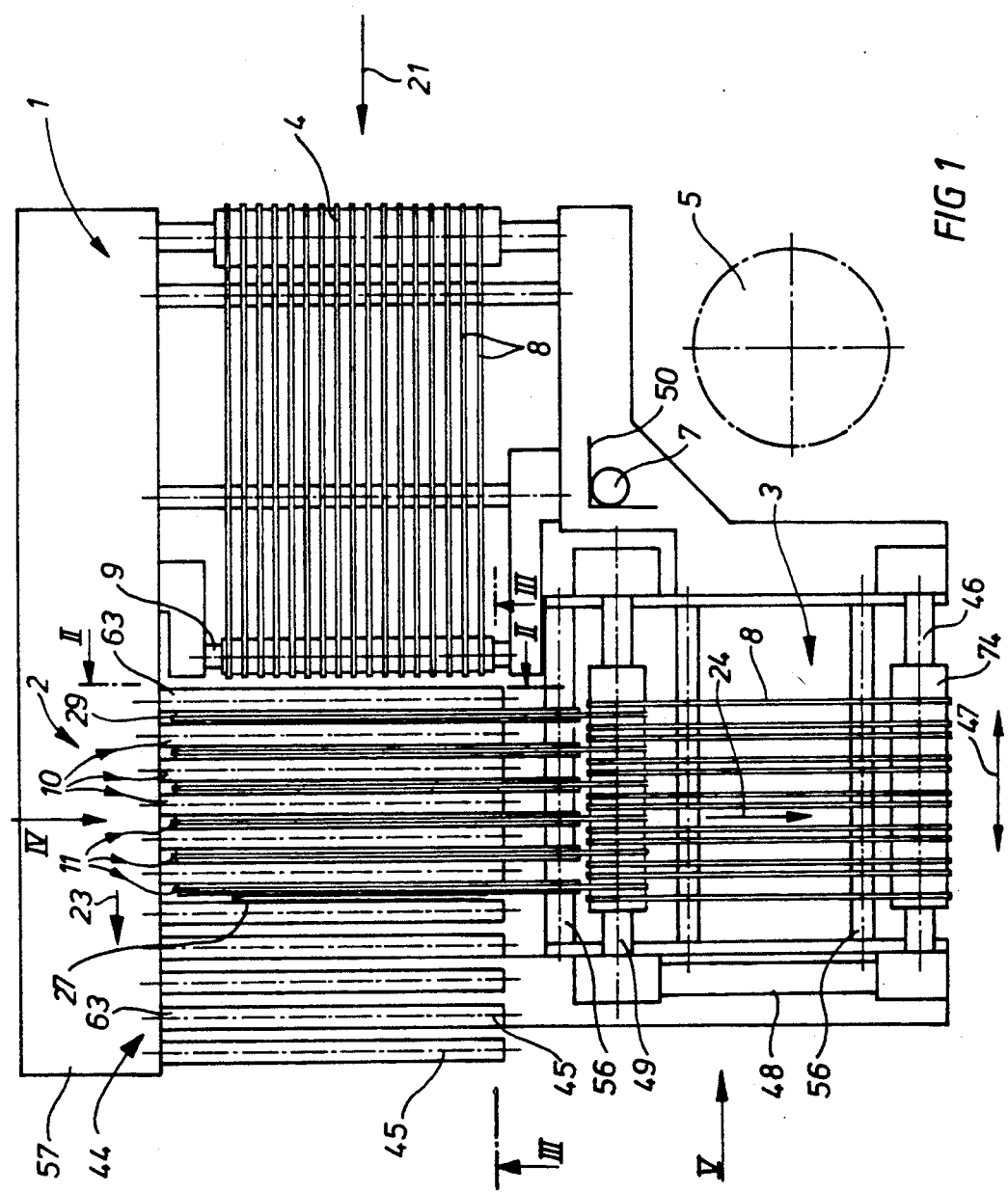
FIG. 1 is a top view of the device according to a first embodiment of the invention.

A supply belt consists of a drive shaft 4, essentially consisting of a shaft with individually grooved disks whereby each disk is embraced by a round belt 8. The drive shaft 4 is driven by a motor 5 which is only indicated in FIG. 1. The round belts driven by the drive shaft 4 in the direction of arrow 21 run over a deflector shaft 9 which is now also driven and which serves as drive shaft for the next reorientation device 2.

Behind the reorientation device 2 in the direction of travel (direction of arrow 21) of the supply belt is an exit roller conveyor 44 via which the product is removed in the direction of arrow 23. Perpendicular to this direction of travel and at an angle to the supply belt is a transfer belt 3 via which the product reoriented in the direction of travel is carried off in the direction of arrow 38.

As seen in FIG. 1, the individual transport rollers of the first conveyor device 10 and of the exit roller conveyor 44 have the same design in the form of transport rollers 53, which are also driven synchronously with one another. Reference will be made to the synchronous drive of these transport rollers in connection with FIG. 4.

The motor 5 drives a central sprocket belt 50 which is brought to the individual drive shafts via a guide wheel 7 only shown schematically. This sprocket belt 50 drives the drive shaft 4 of the supply belt on the one hand, on the other also the drive shaft 46 of the drive of transfer belt 3. FIG. 1 also shows that the drive shaft 46 is coupled to a sprocket belt 48 which in turn drives a second drive shaft 49 intended to drive the second conveyor device 11.

On the drive shaft 46 a tube shaft 74 can be moved in the directions of arrow 47 whereby this tube shaft is fixed to the drive shaft 46. The axial displacement of the tube shaft 74 on the drive shaft 46 effects the aligned orientation of the round belts 8 between the two drive shafts 46 and 49. This makes it possible to set the exit of the reoriented product slice in the direction of arrow 24 or at an angle thereto. This is important when the successive product slices need to overlap, thus setting the overlapping range.

Figure 2:
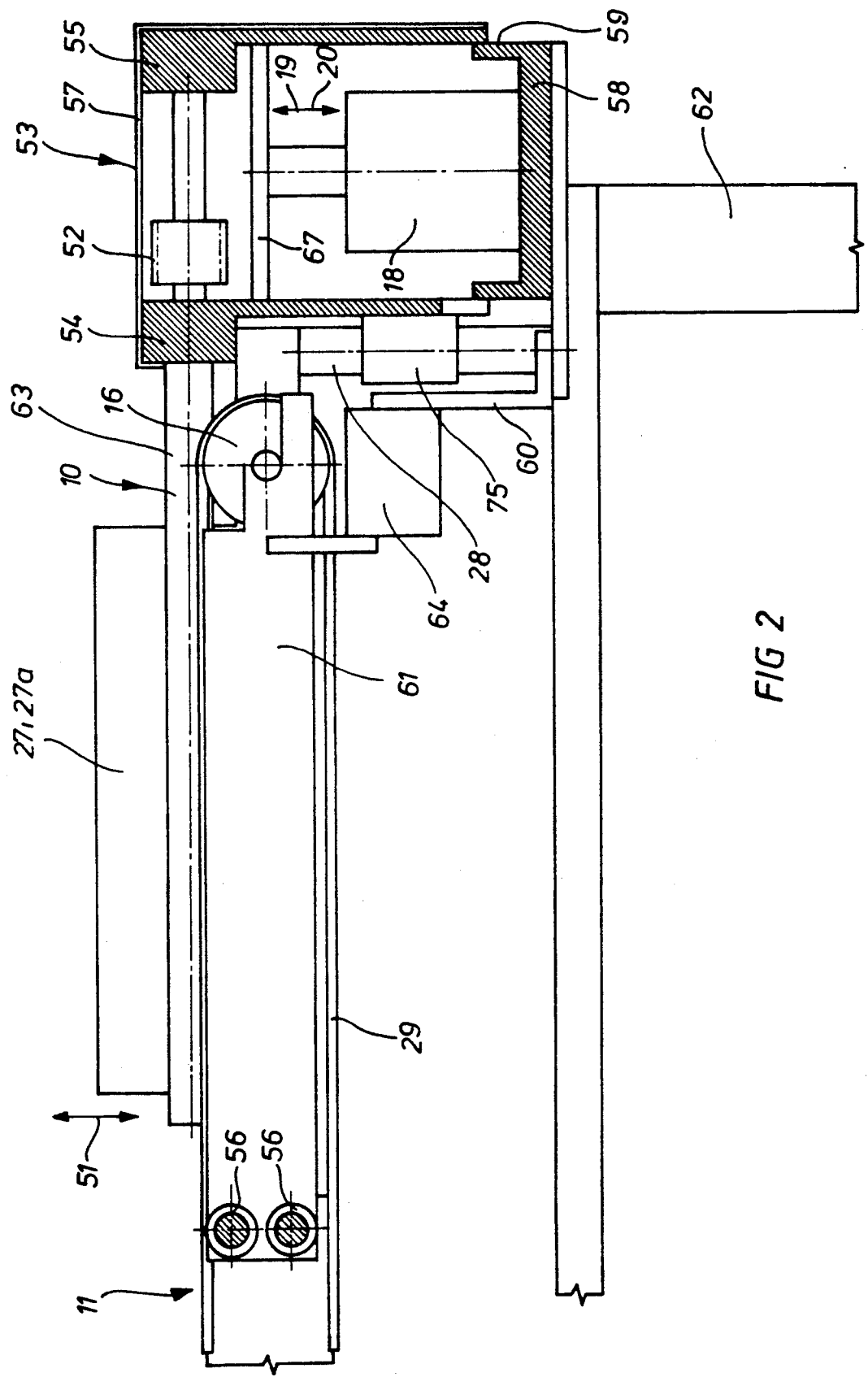
FIG. 2 is a cross-section along II—II in FIG. 1.

According to FIG. 2, the first conveyor device 10 is raisable and lowerable. The individual transport rollers 63 of the first conveyor device 10 are arranged jointly in a horizontal plane parallel to one another in the upper part 57 of a housing 53. Each transport roller 63 is connected with a ratchet wheel 52 whereby all ratchet wheels 52 are embraced by one common sprocket belt 70 in accordance with FIG. 4. This sprocket belt 70 runs via the drive shaft 4 and is driven by it. As shown in FIG. 2, the entire upper part 57 of the housing 53 can be raised or lowered in the directions of arrow 19, 20 in relation to the lower part 58 attached to the frame 62. To this effect, the lower part 58 features a lift cylinder 18 whose piston rod engages a mounting plate 67 fastened to the upper part 57.

The transport rollers 63 are unilaterally lodged and can be rotated in bearings 54, 55 at a reciprocal distance from one another and aligned with one another.

Figure 3:
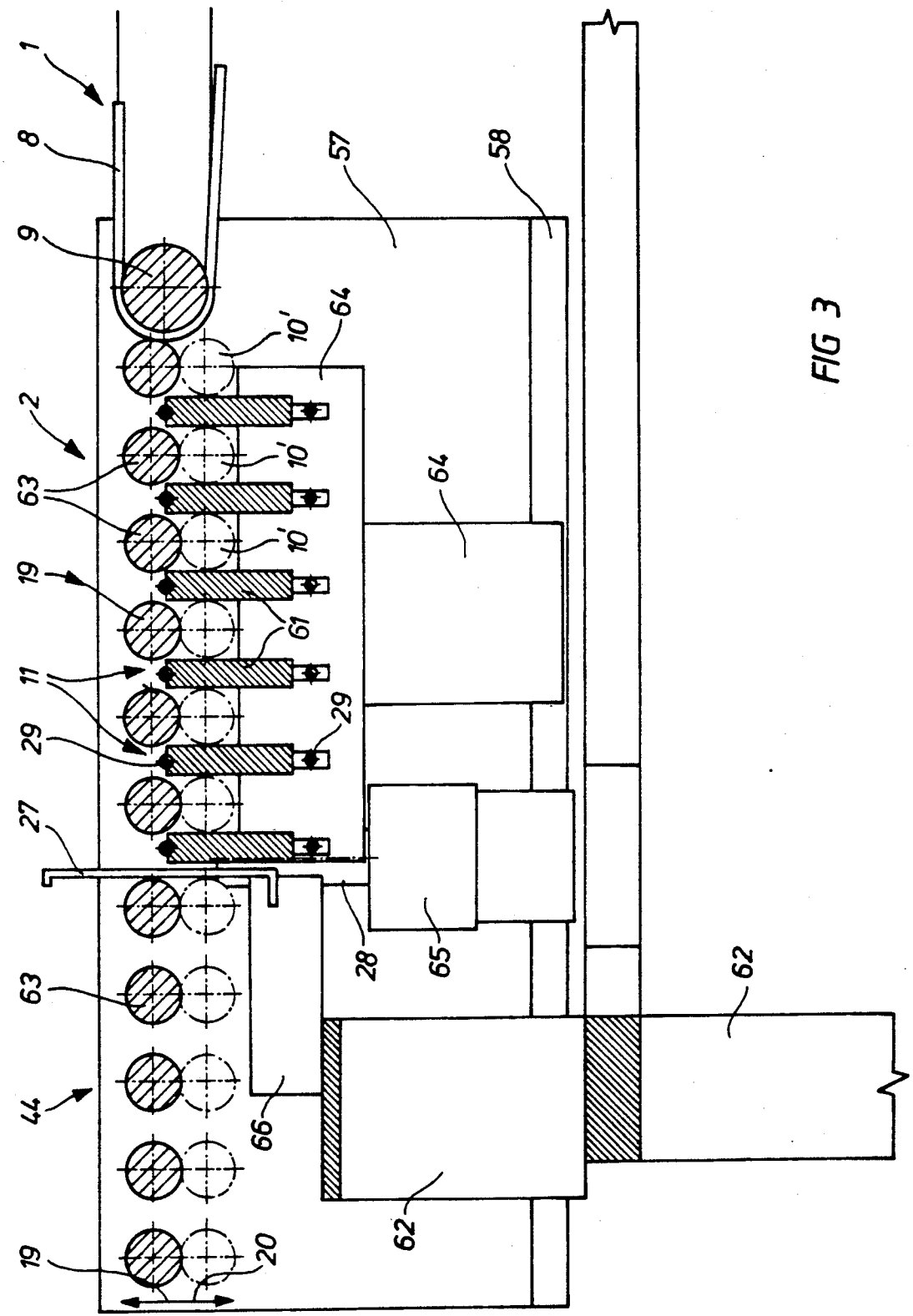
FIG. 3 is a cross-section along III—III in FIG. 1.

As a result, driving the lift cylinder 18 in the direction of the arrow 19 raises the entire upper part 57, and the transport rollers 63 reach their upper raised position in accordance with FIG. 3. However, if the lift cylinder is driven in the opposite direction (direction of arrow 20), the transport rollers 63 are lowered in the direction of arrow 20 and reach the position 10' shown in FIG. 3.

Upon reorientation, the product previously lying on the raised transport rollers 63 is now engaged by the sprocket belts 29 of the second conveyor device in accordance with FIG. 3 and are picked up by this sprocket belt. They then reach the drive shaft 49 on the round belts 8 of the transfer belt 3 and are carried off in the direction of the arrow 24. The feed stop 27 with the stop plate 27a is fastened to a holder 28 which can be moved in a guideway 75. The movement of this stop plate 27a is via a lift cylinder in accordance with FIG. 3.

Figure 5:
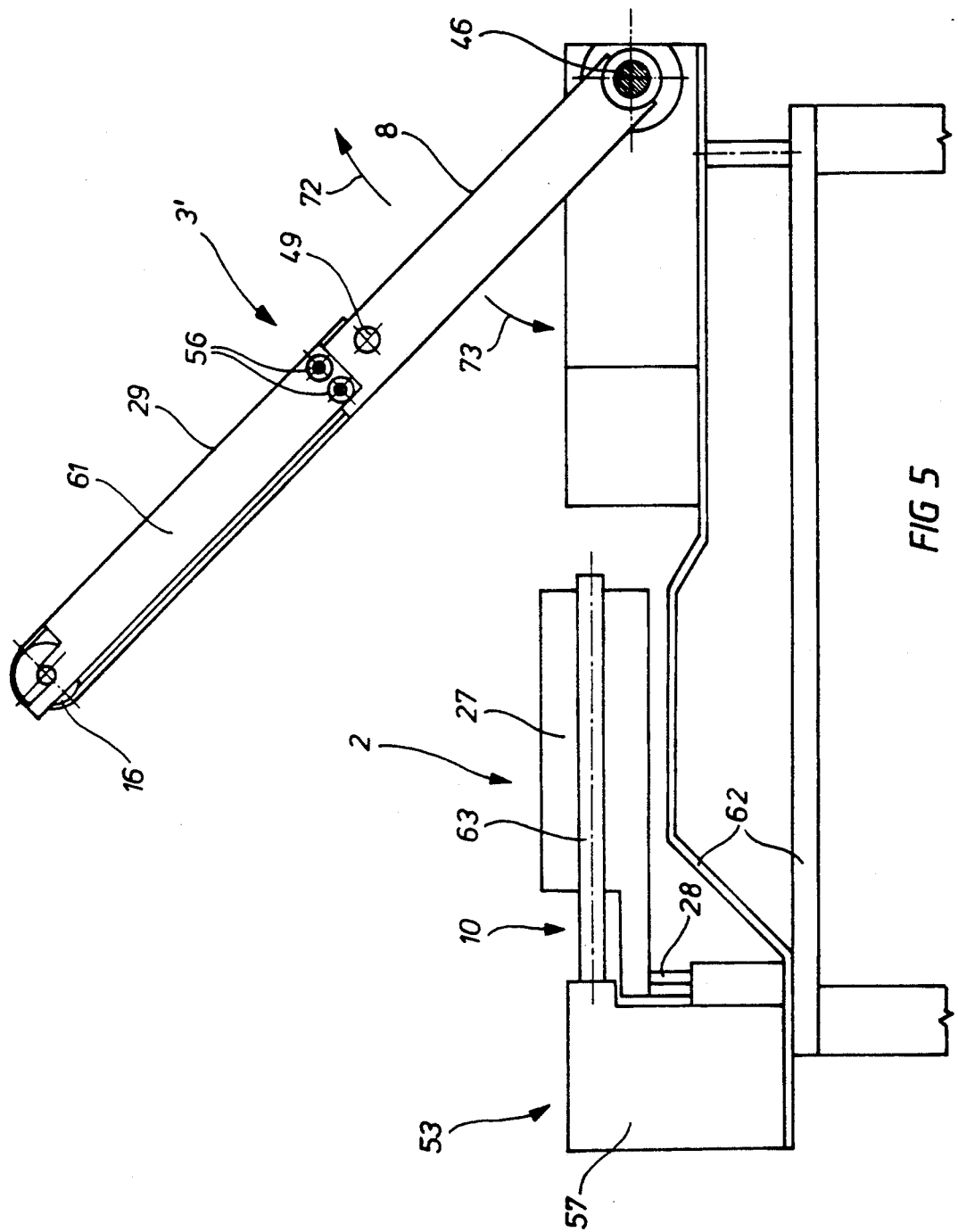
FIG. 5 is a lateral view of the exit side of the device with folded exit belt according to the view in the direction of arrow IV.
Figure 6:
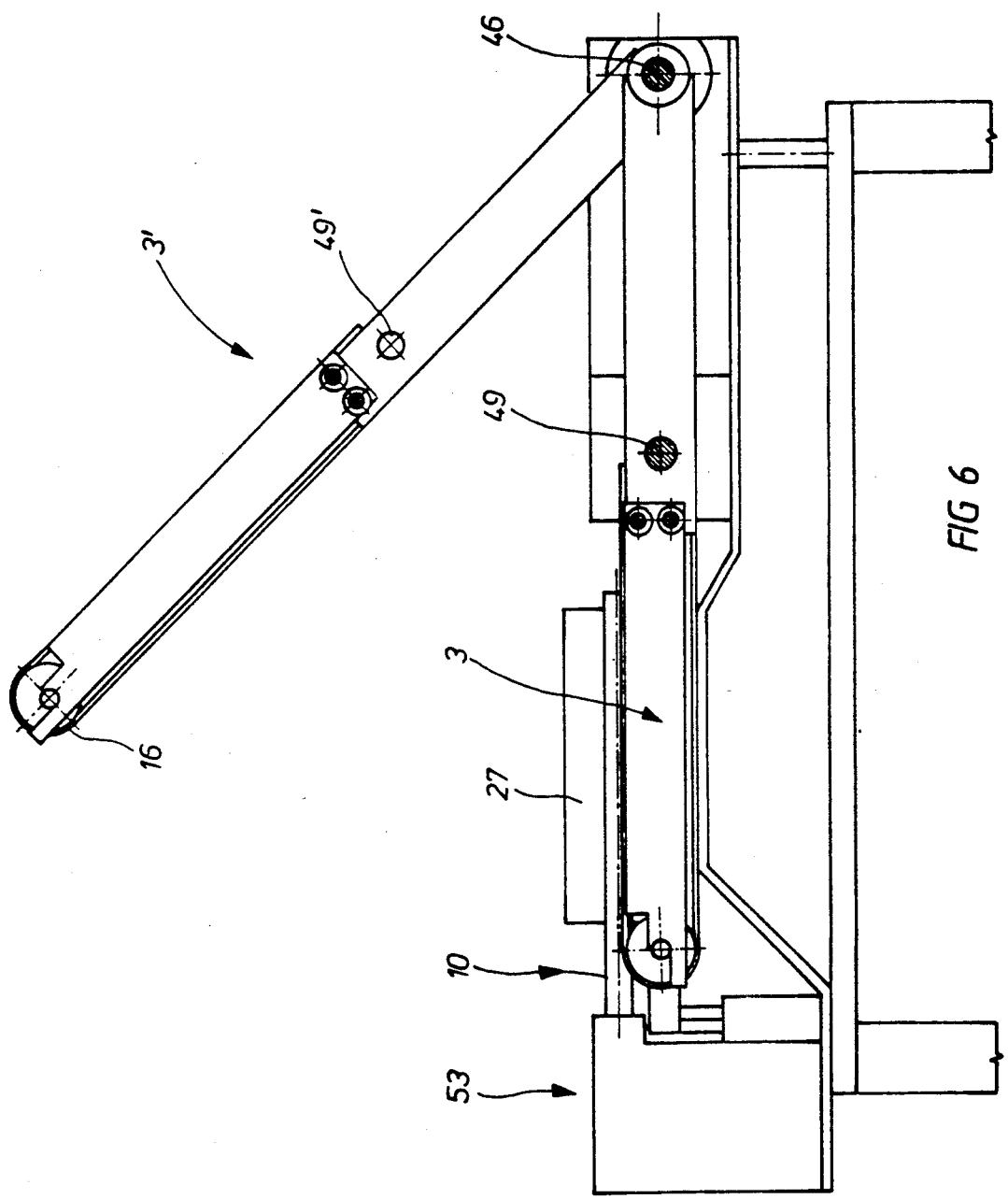
FIG. 6 is the same representation as FIG. 5 in two different operating positions.

FIGS. 2, 5 and 6 also show that the transfer belt 3 can be swung together with the second conveyor device in the area of the drive shaft 46. The round belts 29 of the second conveyor device 11 run over rollers 16, as shown in FIGS. 5 and 6.

The holder 61 guides the round belts 29 between the transport rollers 63 and is held in two superimposed bearing shafts 56 (FIG. 2). The entire assembly is held in a guideway 64 which at the same time serves as stop limit for the holder 61. The guideway 64 is secured to the frame 62 via an angle 60.

FIG. 3 shows that the stop 27 is held in a support 66 and is moved up and down via the guideway 28 according to FIG. 2. The cover 65 covers the upper part 57 of the housing in this area.

Figure 4:
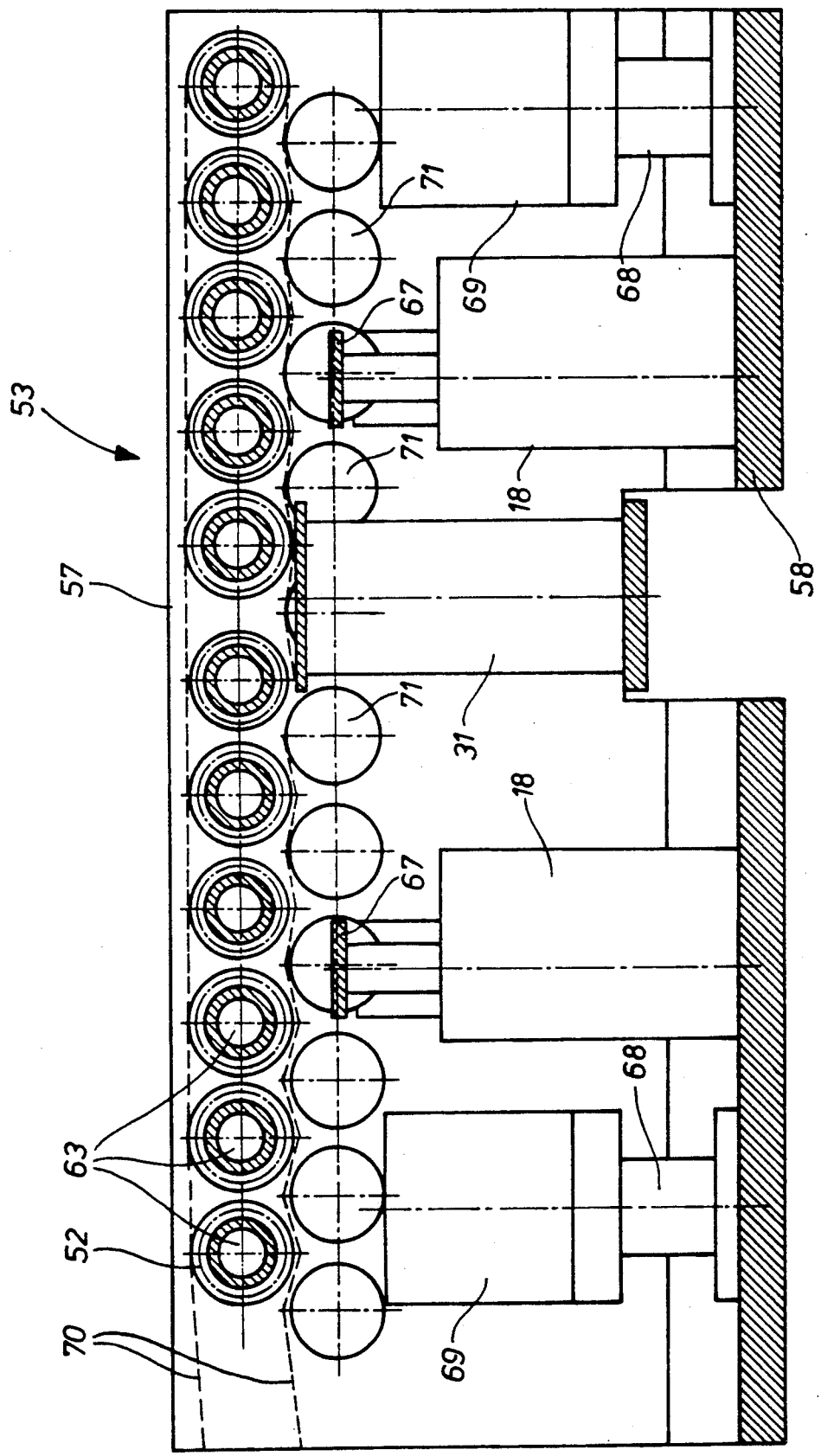
FIG. 4 is a lateral view in the direction of arrow IV in FIG. 1

In accordance with FIG. 4, the individual ratchet wheels 52 of the transport rollers 63 are embraced by the common sprocket belt 70 whereby pressure rollers 71 are arranged to improve pressure which in part engage underneath in the intermediate area between two adjacent ratchet wheels 52 of the respective transport rollers 63. This presses the sprocket belt 70 against the bottom of the ratchet wheel 52 as well, thereby producing a tight connection of all ratchet wheels 52 via the sprocket belt 70.

It is to be noted that the lift cylinder 18 for raising the transport rollers of the first conveyor device 10 is double in order to prevent swing. In contrast, the lift cylinder 31 for raising and lowering the stop plate 27 is single only. In addition, the entire bearing housing 53 can be moved perpendicularly in accordance with FIG. 4 in the area of guideways 69 which can be moved in column sleeves 68.

FIGS. 5 and 6 show that the second conveyor device 11 can be swung in the directions of arrow 72, 73 in connection with the transfer belt 3 thus creating favorable conditions for cleaning the raisable and lowerable belt 3, 11 on the one hand, and releasing the first conveyor device 10 with the transport rollers 63 for easy cleaning.

FIG. 5 also shows that no functional parts are located underneath the entire reorientation device thus eliminating the risk of any product pieces dropping when reoriented and damaging any operational parts. According to FIGS. 5 and 6 all operational parts are arranged within the area of the lateral bearing housing.

The following is a description of the second variant of the present invention in accordance with FIGS. 7 through 10.

On the exit side of the supply belt is a holder 39 on which are arranged individual fixed fender fingers 37 at as distance from each other and parallel to one another. The free front ends of the fender fingers 37 reach into the intermediate areas between the individual slices of the deflector shaft 9 in order to prevent the product transported in the direction of travel 21 from entering the intermediate areas at the transition point with the subsequent reorientation device 2. The free ends of the fender fingers 37 are arranged in the same plane as the round belts 8 in accordance with FIG. 9.

As indicated in the general introduction, the reorientation device 2 consists of two different conveyor devices 10, 11. A first conveyor device 10 consists of individual drive shafts 12 which are parallel to one another and which are driven by a common driving belt 33 in accordance with FIG. 4. The drive of the drive shaft 12 of the first conveyor device 10 is further explained in FIG. 10. It shows a circular closed driving belt 33 which is strung over the parallel drive shafts 12 and which runs over lower rotary guide rollers 34. At the joints of this drive arrangement are other guide rollers 35 which return the driving belt 33. This driving belt 33 runs over the deflector shaft 9 and the deflector shaft 9 in turn is driven by the round belts 8 of the drive shaft 4.

Figure 7:
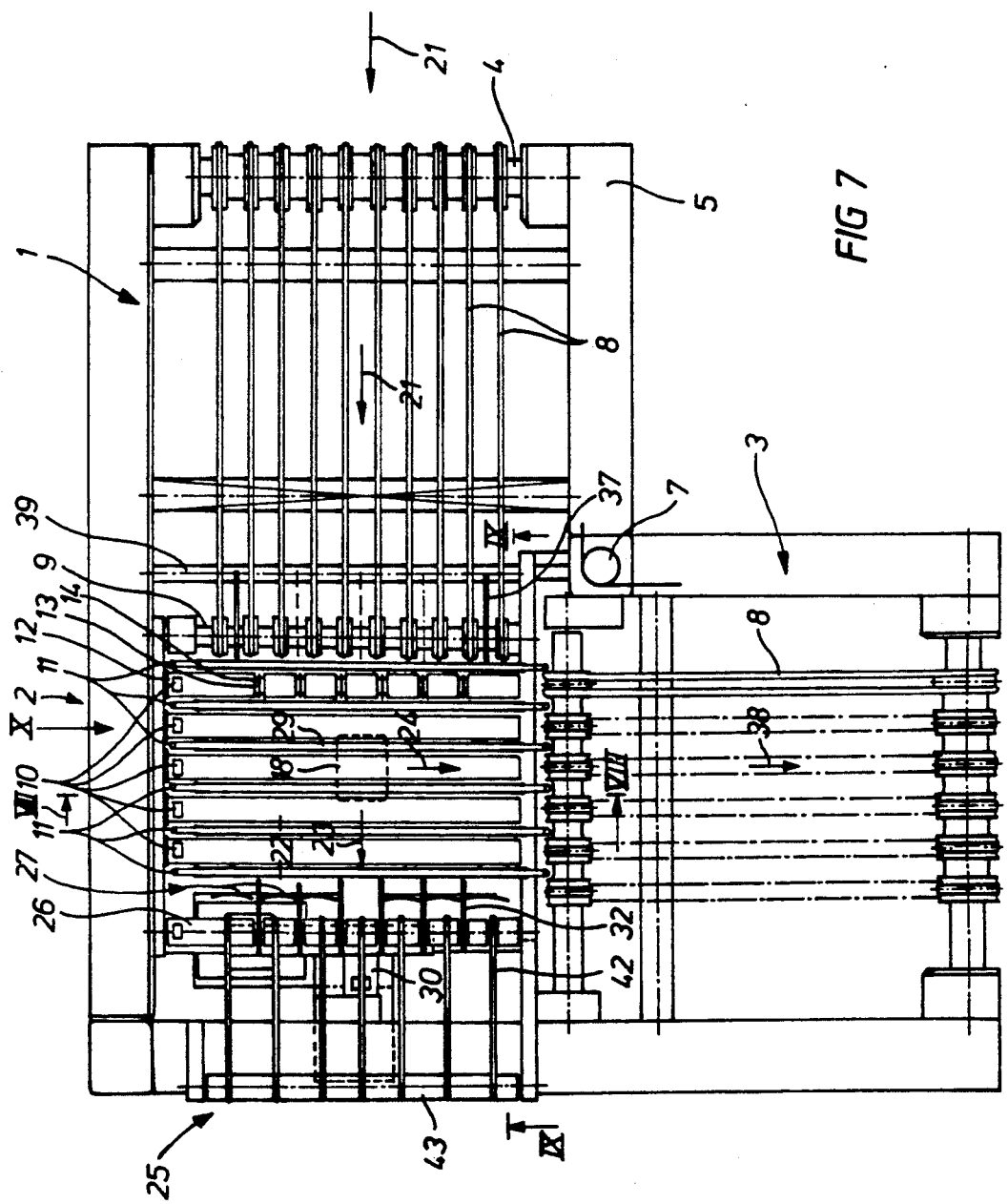
FIG. 7 is a top view of the device according to the second variant of the invention.
Figure 9:
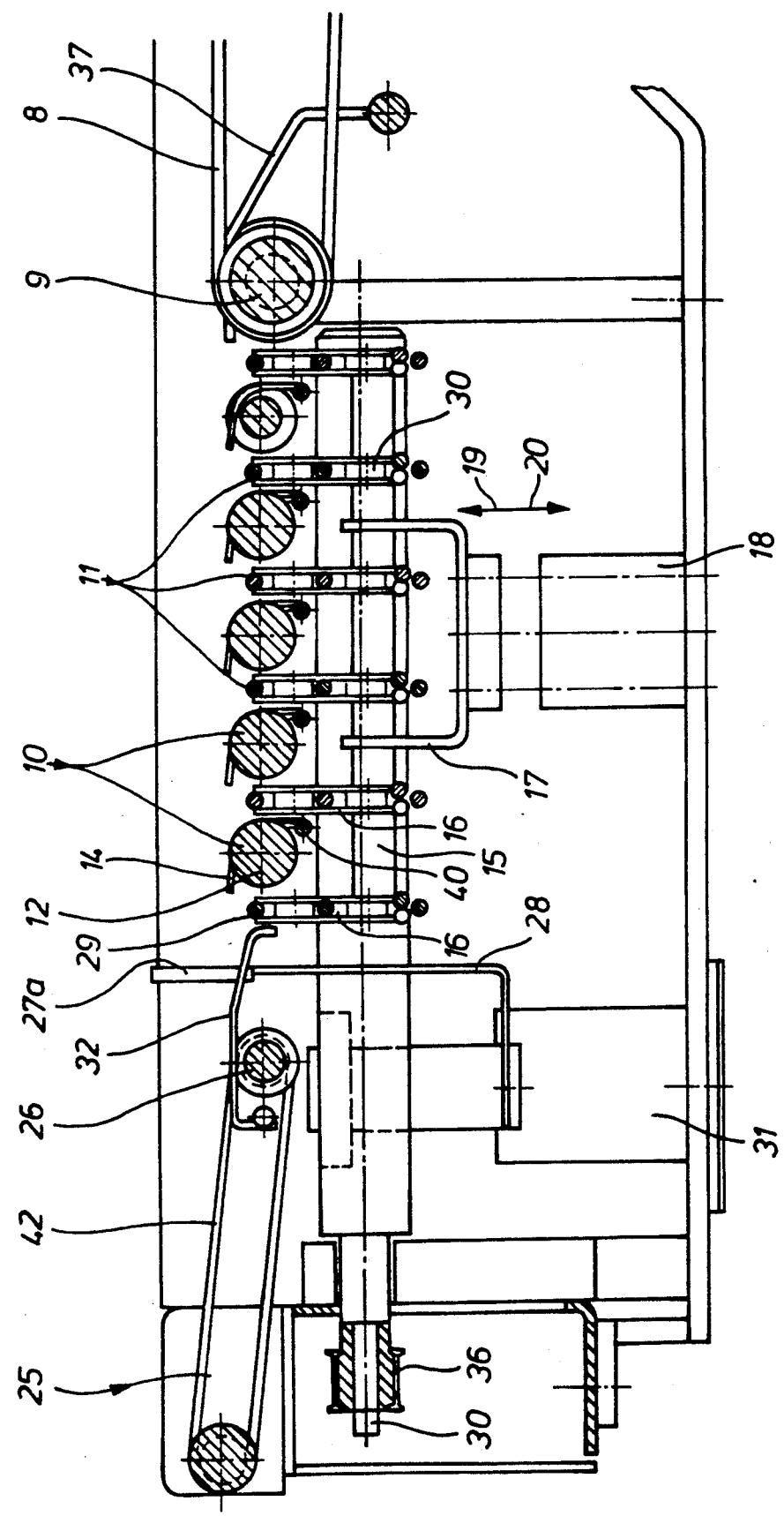
FIG. 9 is a cross-section along IX—IX in FIG. 7.
Figure 10:
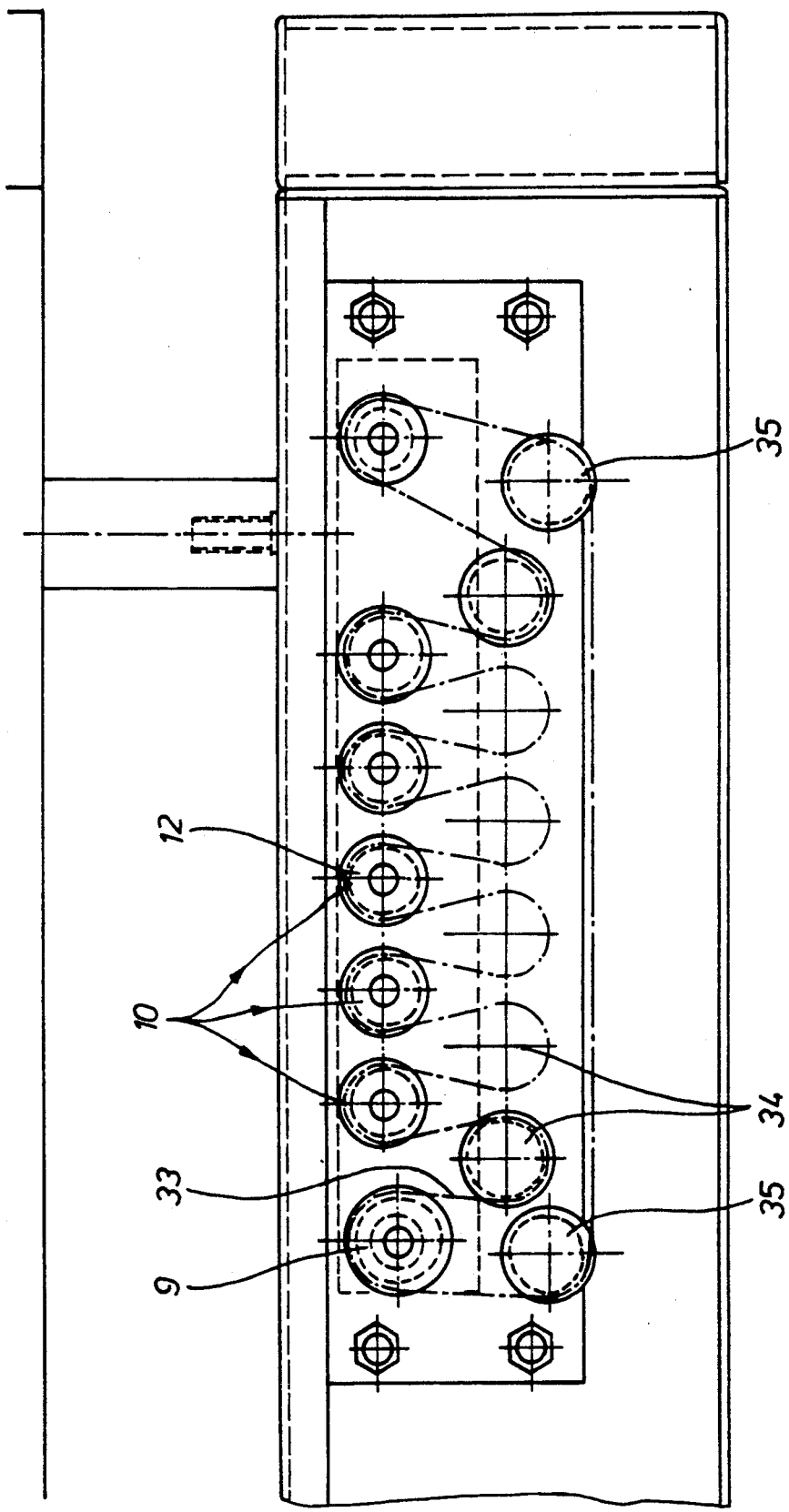
FIG. 10 is an elevational view of the device according to FIG. 7 in the direction of arrow X.

In accordance with FIG. 9 the drive shafts 12 are fixed in a plane and are driven as they rotate. FIG. 7 is a detailed representation of only one drive shaft 12; the other drive shafts are designed the same. Each drive shaft 12 features grooves 13 between which fixed fenders engage. Each fender 14 is attached in a lower fixed axis 40 with a curved end. The purpose of these fenders 14 is to prevent the product from entering the intermediate area between the drive shaft 12 and the perpendicular second conveyor device 11. The free front ends of the fender fingers 37 are sufficiently long to extend slightly beyond the diameter of the drive shaft 12 in order to allow the raising of the second conveyor device 11 with the corresponding rollers 16 in the direction of arrow 19, 20. This ensures that the product transported over the first conveyor device 10 is supported over its entire surface and that the intermediate areas between the first conveyor device and the perpendicular second conveyor device 11 are as small as possible.

Figure 8:
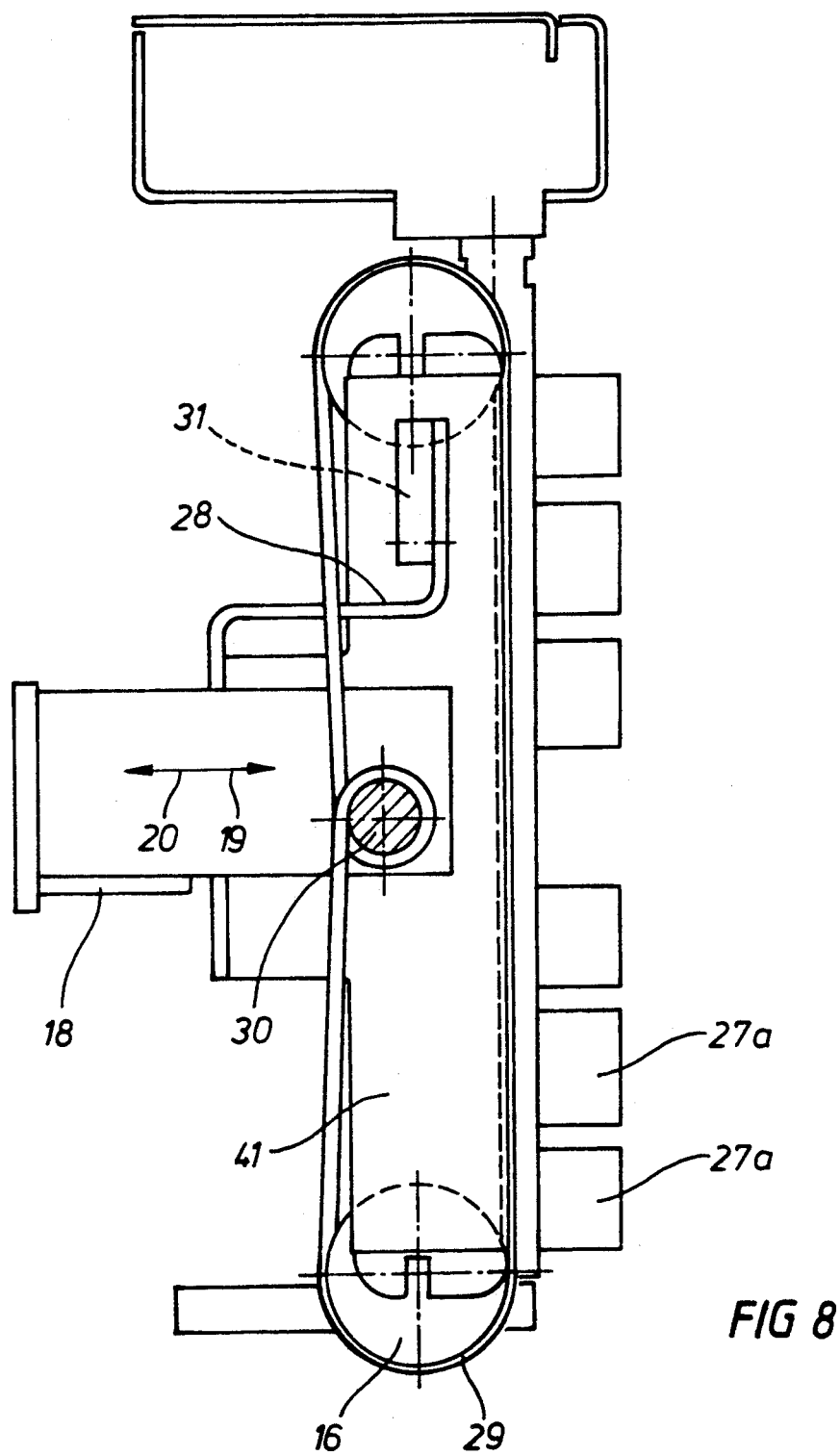
FIG. 8 is a cross-section along VIII—VIII in FIG. 7.

The second conveyor device 11 consists of individual rollers 16 which can be rotated on a double-tongued support 41. The exact arrangement is shown in FIG. 8. All supports 41 are connected to one another and rest on a fork 17 which in turn is connected with the piston rod of a lift cylinder 18.

The individual rollers 16 are driven by a round belt 29 in accordance with FIG. 8 whereby the round belt 29 embraces the rollers 16 which are flush with and across from one another and at the same time embraces a drive axis 30 at an angle of 360° which is driven centrally by the drive shaft 6 of the transfer belt 3 via a ratchet wheel 36. It is to be noted that the supports 41 are attached on the traverse 15.

Behind the reorientation device 2 is the exit belt 25 in the direction of travel 23. Similar to the belts 1, 3 it consists once again of individual parallel round belts 42 whereby the round belts run via the drive shaft 26 as well as via another shaft 43. In the intermediate area between the reorientation device 2 and the exit belt 25 is a feed stop 27 which can be raised or lowered. The feed stop 27 consists of individual stop plates 27a whereby each stop plate 27a is secured to a holder 28 curved at 90° and connected with the piston rod of a second lift cylinder 31.

Each stop plate 27a can be turned and secured around the support 28 in order to compensate for a corresponding stop displacement of the product which encounters the stop plates 27a. This ensures that the product is transported onto the transfer belt 3 exactly in perpendicular direction to the direction of travel 21, i.e. in the direction of the arrow 38.

The following describes in more detail the operation of the device in accordance with the invention.

The product is placed onto the supply belt 1 in the direction of the arrow 21 and then reaches the reorientation device 2 at the exit of the supply belt. The reorientation device 2 is in a lowered position so that the second conveyor device 11 is disengaged and the first conveyor device 10 is engaged with the turning driven drive shafts 12. As a result, the product is conveyed in the direction of the arrow 23 onto the reorientation device 2. Somewhere in the middle of the reorientation device 2 around position 22 is a light barrier which detects the presence of the product slice.

Depending upon the weigh signal described earlier, the control for controlling the lift cylinders 18, 31 now knows what needs to occur next. If the product is good, the lift cylinder 31 remains in its raised position in the direction of arrow 19, i.e. stop plates 27a assume their positions in accordance with FIG. 8.

After the light barrier signal has detected the presence of the product slice, a control signal is given to the lift cylinder 18 which is raised in the direction of the arrow 19 whereby the second conveyor device 11 which is driven at all times engages the product, which first is still on the first conveyor device 10. The product is raised by the second conveyor device 11 and is transported by the rotating round belts 29 in the direction of arrow 24 and conveyed onto the transfer belt 3. After it is also driven actively, the product is carried off via the transfer belt 3 for further processing.

After the product has been transferred onto the transfer belt 3, the light barrier 22 detects the absence of the product on the reorientation device 2, and the feed stop 27 with the stop plates 27a remains in raised position in the direction of the arrow 19 while the lift cylinder 18 is lowered after an adjustable period of time in the direction of the arrow 20.

Similarly, the control of the reorientation device onto the exit belt 25 occurs when previously a weight signal detected that the product (individual slice) which reached the supply belt 1 is to be separated.

In this case, the lift cylinder 18 remains lowered in the direction of the arrow 20 and at the same time when the light barrier 22 detects the presence of the individual slice the lift cylinder 31 is lowered in the direction of the arrow 20 thus resulting in a longitudinal transport of the individual slice onto the exit belt 25 in the direction of the arrow 23.

An essential characteristic of the present device is the fact that all four belts (supply belt 1, reorientation device 2 consisting of conveyor devices 10 and 11 as well as the transfer belt 3) are driven by a single motor 5 described above.

Essential in the present invention is also the fact that the individual slice, whether or not placed on foil, never comes in contact with any part of the transport mechanism. Even when it is on a foil, the product to be transported is always in contact with a conveyor medium along its entire path. The conveyor medium is either the supply belt the first conveyor device 10 of the reorientation device 2 and the exit belt 25, or the supply belt 1, the second conveyor device 11 of the reorientation device 2 and the exit belt 3.

In none of these transport paths does the product become disengaged with the round belts or one of the driven drive shafts, so that the product cannot turn on the foil. This makes it possible to reorient an individual slice of a food even if it is brittle in a particularly gentle manner without the risk of the individual slice turning on the foil or of being damaged by breaking.

The arrangement of adjustable feed stops 27 consisting of individual stop plates 27a at the exit end of the first conveyor device 10 is important because it ensures that the product transported over the first conveyor device 10 in the direction of arrow 23 is easily brought to this feed stop 27 in order to guarantee an additional alignment of the product to ensure that this product is in exactly perpendicular position (direction of arrow 38), caught by the second conveyor device 11 and carried off. This defined stop position (manufacture of a defined lateral deflection of individual slices) is particularly important when for the production of mixed cuts it is important that the slices transported in the direction of the arrow 38 by the transfer belt 3 are oriented exactly parallel to the direction of the arrow 38 to ensure in the subsequent course of the transport path that such exactly oriented slices are stacked exactly on top of one another. This also optimizes the use of a foil packaging machine which is able to operate with less foil waste.

Although preferred embodiments of the invention have been described above by way of example only, it will be understood by those skilled in the field that modifications may be made to the disclosed embodiments without departing from the scope of the invention, which is defined by the appended claims.

I claim:

1. Device for the perpendicular change in the direction of transportation of a food, in particular cheese, sausage and such a slice form, whereby the food in connection with a rotation of 90° is transferred to a perpendicular transfer belt, whereby a supply belt in the direction of travel places the food as individual slice on a reorientation device, whereby the reorientation device features a first and second lift position and the first raised lift position transports the individual slice in longitudinal direction in a first conveyor device in the original direction of travel while in the second lowered lift position a second displaced conveyor device engages the individual slice and transfers it onto the transfer belt, the second conveyor device comprising a conveyor belt device and the transfer belt having a drive shaft, the conveyor belt device and the transfer belt being arranged on a plane behind one another and being swingable jointly around the drive shaft.

2. Device for the perpendicular change in the direction of transportation of a food, in particular cheese, sausage and such in slice form, whereby the food in connection with a rotation of 90° is transferred to a perpendicular transfer belt, whereby a supply belt in the direction of travel places the food as individual slice on a reorientation device, whereby the reorientation device features a first and second lift position and the first raised lift position transports the individual slice in longitudinal direction in a conveyor device in the original direction of travel while in the second lowered lift position another displaced conveyor device engages the individual slice and transfers it onto the transfer belt, the transfer belt including a drive shaft with a movable tube shaft making it possible to set the exit of the deflected product slice.

3. Device as claimed in claim 1, wherein
said first conveyor device comprises a series of a spaced, parallel transport rollers extending perpendicular to one of said travel directions with a predetermined spacing between each adjacent pair of transport rollers; and
said second conveyor device comprises a series of spaced parallel conveyor belts extending parallel to said transport rollers and designed to fit in the spacings between said rollers, each conveyor belt being positioned in vertical alignment with the spacing between a respective pair of transport rollers;
the reorientation device further including lift means for moving one of said conveyor devices vertically relative to the other conveyor device between said first and second lift positions,
said lift means comprising means for moving one of said conveyor devices so that the conveyor belts pass between the transport rollers in an interdigitating manner between said first and second transport positions.

4. Device in accordance with claim 3, including a second lift means for controlling movement of a longitudinal stop in said first direction of travel, whereby the shift of the reorientation device from the first to the second belt position, respectively to the second direction of travel occurs through a timed control of said first-mentioned lift means in connection with the also timed control of a longitudinal stop via said second lift means.

5. Device in accordance with claim 3 whereby the reorientation of the product is at an angle of 90° in relation to the original direction of travel.

6. Device in accordance with claim 3 whereby said supply belt, transfer belt, and first and second conveyor devices are all driven by a single motor.

7. The device as claimed in claim 3, wherein said lift means comprises means for moving said first conveyor device vertically, said first conveyor device further including a bearing housing for housing said transport rollers, and said lift means comprising a lift cylinder for moving said bearing housing vertically between said first and second lift positions.

8. The device as claimed in claim 3, including drive means for driving said supply belt, and a drive belt extending around said transport rollers of said reorientation device, the drive belt being linked to said supply belt drive means for driving said supply belt and transport rollers in synchronism.

9. The device as claimed in claim 3, including an exit conveyor belt aligned with said supply belt on the opposite side of said reorientation device to said supply belt for selectively conveying products from said reorientation device in said first direction of travel, stop means between said reorientation device and exit conveyor belt for preventing movement of product from said reorientation device to said exit conveyor belt, and actuator means for selectively moving said stop means between a raised position preventing movement of said product onto said exit conveyor and a lowered position allowing movement of said product onto said exit conveyor.

* * * * *